(12) United States Patent
Tsuneki et al.

(10) Patent No.: US 10,058,954 B2
(45) Date of Patent: Aug. 28, 2018

(54) LASER PROCESSING DEVICE HAVING GAP CONTROL FUNCTION AND CONTROLLER THEREOF

(71) Applicant: FANUC CORPORATION, Minamitsuru-gun, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 339 days.

(21) Appl. No.: 15/085,193

(22) Filed: Mar. 30, 2016

(65) Prior Publication Data

US 2016/0288253 A1    Oct. 6, 2016

(30) Foreign Application Priority Data

Mar. 31, 2015  (JP) .................. 2015-073581

(51) Int. Cl.
| | |
|---|---|
| *G05B 19/00* | (2006.01) |
| *G05B 19/402* | (2006.01) |
| *G05B 19/416* | (2006.01) |
| *B23K 26/04* | (2014.01) |
| *B23K 26/08* | (2014.01) |

(52) U.S. Cl.
CPC ............ *B23K 26/048* (2013.01); *B23K 26/08* (2013.01); *G05B 19/402* (2013.01); *G05B 19/416* (2013.01); *G05B 2219/37397* (2013.01); *G05B 2219/43006* (2013.01); *G05B 2219/45165* (2013.01)

(58) Field of Classification Search
CPC ............ G05B 19/402; G05B 19/416; G05B 2219/37397; G05B 2219/45165
USPC .......................................................... 700/166
See application file for complete search history.

(56) References Cited

U.S. PATENT DOCUMENTS

| | | | |
|---|---|---|---|
| 2004/0135536 A1* | 7/2004 | Iwashita | G05B 19/39 318/652 |
| 2013/0103183 A1* | 4/2013 | Mochida | G05B 19/19 700/186 |

FOREIGN PATENT DOCUMENTS

| | | | |
|---|---|---|---|
| JP | H09-308979 A | 12/1997 | |
| JP | 2008200712 A | 9/2008 | |
| JP | 2010-125518 A | 6/2010 | |
| JP | 2013086172 A | 5/2013 | |

* cited by examiner

*Primary Examiner* — Michael J Brown

(74) *Attorney, Agent, or Firm* — RatnerPrestia

(57) ABSTRACT

A controller and a laser processing device having the controller, capable of reducing time for switching feedback control to gap control, and capable of moving a processing nozzle relative to a workpiece so that an amount of change in acceleration when switching is minimized. The controller has: a deceleration start distance calculating part which calculates a deceleration start distance corresponding to a distance between the nozzle and the workpiece when deceleration of approach motion of the nozzle is started; a first velocity command generating part which generates a first velocity command value based on the deceleration start distance, a predetermined maximum approach velocity and deceleration rate; a second velocity command generating part which generates a second velocity command value based on a gap target value and a feedback value; and a velocity command switching part which selects one of the first and second velocity command values.

7 Claims, 4 Drawing Sheets

LASER PROCESSING DEVICE HAVING GAP CONTROL FUNCTION AND CONTROLLER THEREOF

BACKGROUND OF THE INVENTION

1. Field of the Invention

The present invention relates to a laser processing device configured to carry out laser processing while controlling a gap between a processing nozzle and an object to be processed, and relates to a controller of the laser processing device.

2. Description of the Related Art

Generally, in laser processing using a laser processing machine, gap control is carried out, in which a processing nozzle approaches an object to be processed and a distance (gap) between the object and the processing nozzle is maintained. In this case, feedback control, in which an output from a position detector for detecting the position of the processing nozzle is used, is switched to the gap control in which an output from a gap sensor for detecting the distance between the processing nozzle and the object is used.

As a relevant prior art document, JP H09-308979 A discloses a laser processing device for reducing a movement time of a copy approach motion, by: generating a movement command during the copy approach motion based on copy approach velocity information, acceleration information, deceleration stopping distance information and distance information up to a gap reference position; and accelerating/decelerating the copy approach motion from a retreat position to a reference position of the copy motion, based on predetermined velocity information and acceleration information, while using information from a gap sensor as the distance information.

Further, JP 2010-125518 A discloses a laser processing device including: a control axis to which a processing nozzle is attached; a driving part for driving the control axis so that the processing nozzle is moved toward or away from an object to be processed; a servo controlling part for controlling the driving part; a position detecting part for detecting the position of the driving part; and a gap sensor for detecting a gap between the processing nozzle and the object. In this document, it is described that the servo controlling part changes the position of the driving part detected by the position detecting part based on a gap detection value detected by the gap sensor, and gap control is carried out so as to maintain the gap between the processing nozzle and the object.

FIG. 6 shows a temporal change in a velocity command value for approach motion in a conventional laser processing machine. First, (a control axis for driving) a processing nozzle is operated based on a first velocity command value 102. In detail, the processing nozzle is accelerated to maximum approach velocity Fa (region 104), and the processing nozzle is moved at constant velocity Fa until an output from a gap sensor corresponds to a deceleration start distance region 106. After that, the processing nozzle is decelerated at a predetermined deceleration rate (region 108). In this regard, "Td" in FIG. 6 represents a time point when the output of the gap sensor is equal to the deceleration start distance.

During the deceleration motion (region 108), first velocity command value 102 is switched to a second velocity command value 110 generated based on the output of the gap sensor. Concretely, at a point 112 (or time point x) where first velocity command value 102 is equal to second velocity command value 110, the velocity command value for controlling the motion of the processing nozzle is switched from first velocity command value 102 to second velocity command value 110.

However, in this case, since the velocity of the processing nozzle is rapidly changed at time point x, the processing nozzle is shocked at the time when switching the velocity command value, whereby the gap control thereafter may be adversely affected. Therefore, when the approach motion is adjusted, it is necessary to determine a parameter (or the deceleration start position) so as to smoothly switch the velocity command value. On the other hand, it is preferable that the approach time (or time Tf when the second velocity command value is equal to zero) be short as possible, whereas such adjustment is difficult and cumbersome.

SUMMARY OF THE INVENTION

An object of the present invention is to provide a controller and a laser processing device having the controller, capable of reducing an approach motion time for switching feedback control to gap control, and capable of moving a processing nozzle relative to an object to be processed so that an amount of change in acceleration when switching is minimized.

Accordingly, the present invention provides a controller for a laser processing device for processing an object to be processed by condensing light from a processing nozzle, irradiating the light to the object, and moving the processing nozzle and/or the object relative to each other based on a processing program, the controller comprising: a deceleration start distance calculating part which calculates a deceleration start distance corresponding to a distance between the processing nozzle and the object when deceleration of relative movement between the processing nozzle and the object is started; a first velocity command generating part which generates a first velocity command value based on the deceleration start distance, a predetermined maximum approach velocity and a predetermined deceleration rate; a second velocity command generating part which generates a second velocity command value based on a target value of a gap between the processing nozzle and the object and a feedback value from a gap sensor for detecting the gap; and a velocity command switching part which switches a velocity command for the relative movement between the first and second velocity command values, wherein the deceleration start distance calculating part obtains the first velocity command value after the distance between the processing nozzle and the object is equal to the deceleration start distance and the second velocity command value, and calculates the deceleration start distance so that an absolute value of a difference between the first and second velocity command values at a first time point is equal to or smaller than 10% of an absolute value of the first velocity command value at the first time point, and so that an absolute value of a difference between first order differential values of the first and second velocity command values at the first time point is equal to or smaller than 10% of an absolute value of the first order differential value of the first velocity command value at the first time point.

In a preferred embodiment, the first velocity command generating part calculates the first velocity command value by multiplying a difference between the target value and the feedback value from the gap sensor by a gap control gain K, and the deceleration start distance calculating part calculates the deceleration start distance Ld by using a following equation, wherein characters K, Fa and A represents the gap control gain, the maximum approach velocity and the deceleration rate, respectively.

$$Ld=(Fa^2/2A)+(A/2K^2)$$

Preferably, the absolute value of the difference between the first and second velocity command values at the first time point is equal to zero.

Preferably, the absolute value of the difference between the first order differential values of the first and second velocity command values at the first time point is equal to zero.

In a preferred embodiment, the velocity command switching part carries out the relative movement based on the first velocity command value after the deceleration of the relative movement is started, and carries out the relative movement based on the second velocity command value after the second velocity command value is equal to or smaller than the first velocity command value.

In a preferred embodiment, when the first velocity command value becomes zero and the second velocity command value is not equal to zero without switching from the first velocity command value to the second velocity command value by the velocity command switching part, the velocity command switching part carries out the relative movement based on a third velocity command value for accelerating the relative movement at an acceleration rate, an absolute value of the acceleration rate of the third velocity command value being equal to an absolute value of the deceleration rate, and the velocity command switching part carries out the relative movement based on the second velocity command value after the third velocity command value intersects with the second velocity command value.

Further, the present invention provides a laser processing device comprising: the controller of the invention; a processing nozzle; a control axis which controls a distance between the processing nozzle and an object to be processed by a servomotor; a position detecting part which detects a position of the control axis; and a gap sensor which detects a gap between the processing nozzle and the object, the gap sensor being different from the position detecting part, wherein the laser processing device processes the object by condensing light from the processing nozzle, irradiating the light to the object, and moving the processing nozzle and/or the object relative to each other based on a processing program.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
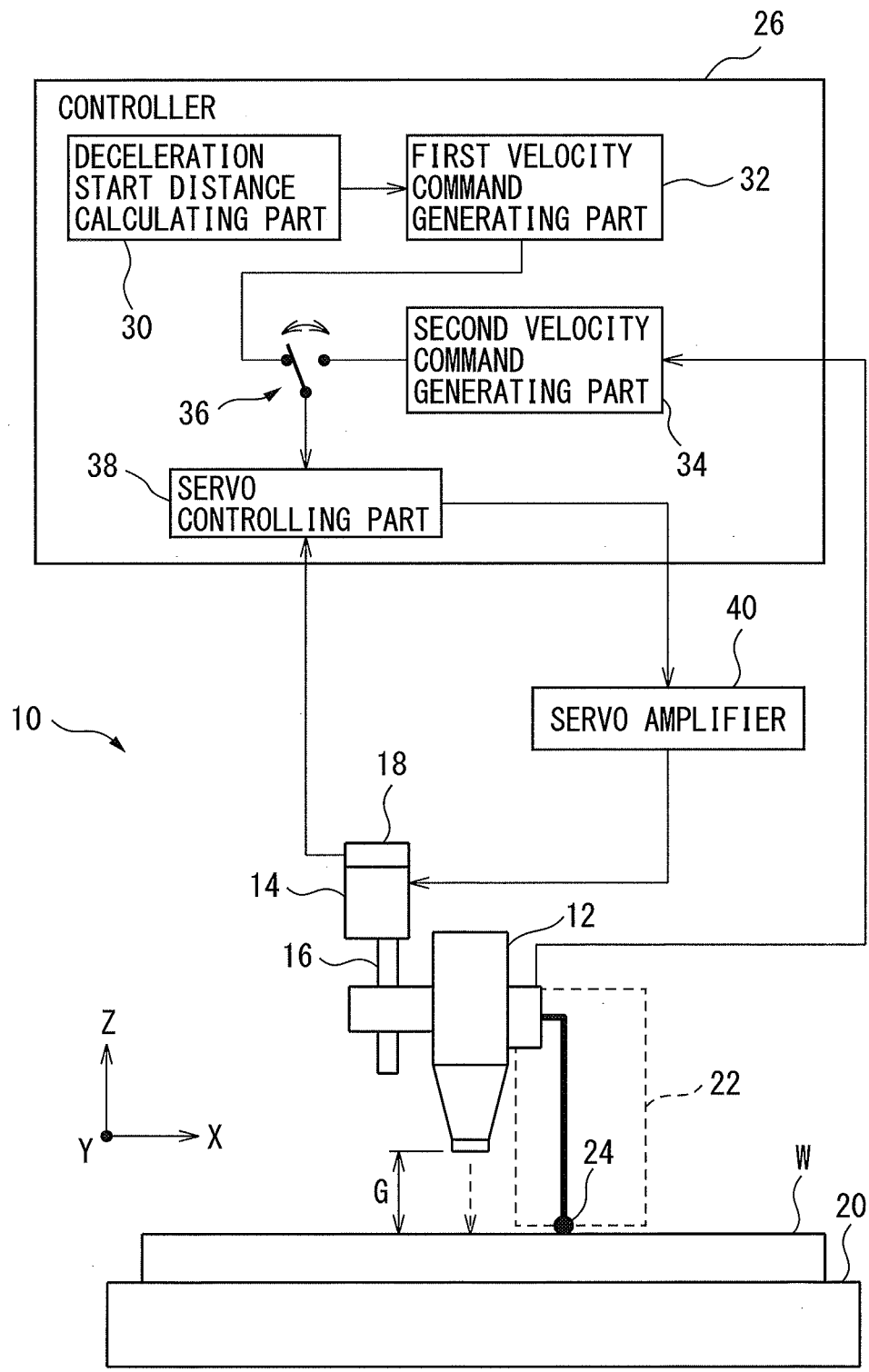
FIG. 1 shows a schematic configuration of a laser processing device according to a preferred embodiment of the present invention.

FIG. 1 shows a schematic configuration of a laser processing device including a controller according to a preferred embodiment of the present invention. Laser processing device 10 has a processing nozzle 12 which irradiates a laser beam via a laser oscillator not shown, and is configured to process an object (workpiece) W to be processed by condensing light (by using a collective lens not shown, etc.) from processing nozzle 12, irradiating the light to workpiece W, and moving processing nozzle 12 and/or workpiece W relative to each other based on a predetermined processing program.

Laser processing device 10 has a control axis 16 which controls a distance between processing nozzle 12 and workpiece W by a servomotor 14, and a position detecting part 18, such as an encoder, which detects a position of control axis 16. In the illustrated embodiment, control axis 16 extends in the generally vertical direction (or a Z-direction), so that processing nozzle 12 can be moved toward or away from workpiece W in the Z-direction. Further, in the illustrated embodiment, workpiece W is mounted on and held by a movable table 20 which is movable in an X-Y plane perpendicular to the Z-direction.

Laser processing device 10 also has a gap sensor 22 which detects a gap G between processing nozzle 12 and workpiece W, and gap sensor 22 is different from position detecting part 18. Gap sensor 22 may have any configuration as long as it can detect gap G between processing nozzle 12 and workpiece W. In the illustrated embodiment, gap sensor 22 is attached to processing nozzle 12, and has a contact element 24 which can contact workpiece W. Alternatively, instead of contact element 24, a capacitance type gap sensor (not shown) may be used, and a conversion circuit may be used for converting an output by the capacitance type gap sensor to the same type of output as position detector 18.

The relative movement between processing nozzle 12 and workpiece W (in the illustrated embodiment, the position in the Z-direction of control axis 16) is controlled by a controller (CNC) 26 included in laser processing device 10. Concretely, controller 26 has a deceleration start distance calculating part 30 which automatically calculates a deceleration start distance Ld (explained below) where the deceleration of the movement of processing nozzle 12 relative to workpiece W during the approach motion of processing nozzle 12 is started; a first velocity command generating part 32 which generates a first velocity command value based on deceleration start distance Ld, a predetermined maximum approach velocity Fa and a predetermined deceleration rate A (explained below); a second velocity command generating part 34 which generates a second velocity command value based on a target value of gap G and a feedback value from gap sensor 32; and a velocity command switching part 36 which selects one of the first and second velocity command values and transmits the selected velocity command value to a servo controller 38. Servo controller 38 generates and outputs a velocity command for control axis 16 (concretely, a servo amplifier 40 for supplying power to servomotor 14 for driving control axis 16), based on the first or second velocity command value from velocity command switching part 36.

Although not shown, controller 26 may have a display (for example, a CRT or LCD) which displays the position and velocity of the movable part such as processing nozzle 12, and a laser status and processing conditions of laser processing device 10, etc. Also, controller 26 may have an inputting part (for example, a keyboard or mouse), by which the operator can input a laser output condition and/or various data, etc.

Next, the velocity command generated by controller 26 will be explained with reference to FIG. 2. First, (control axis 16 for driving) processing nozzle 12 is operated based on first velocity command value 42. In detail, processing nozzle 12 is accelerated to maximum approach velocity Fa (region 44), and is moved at velocity Fa over a predetermined period of time (region 46). After that, from time point Td when the distance between processing nozzle 12 and workpiece W is equal to deceleration start distance Ld, processing nozzle 12 is decelerated at a predetermined deceleration rate (region 48).

During the decelerating motion (region 48), the velocity command value is switched from first velocity command value 42 to second velocity command value 50 generated based on the target value of gap G and the output from gap sensor 22. Concretely, the velocity command value to be transmitted to servo amplifier 40 is switched from first velocity command value 42 to second velocity command value 50, at point 52 (first time point x) which satisfies the following condition.

At first time point x, an absolute value of the difference between first velocity command value 42 and second velocity command value 50 is equal to or smaller than 10% (preferably, 5%, 3% or 1%) of an absolute value of first velocity command value 42 at time point x. Most preferably, the difference between first velocity command value 42 and second velocity command value 50 is equal to zero (i.e., first velocity command value 42 is equal to second velocity command value).

Further, at first time point x, an absolute value of the difference between first order differential values of first and second velocity command value 42 and second velocity command value 50 is equal to or smaller than 10% (preferably, 5%, 3% or 1%) of an absolute value of the first order differential value of first velocity command value 42 at time point x. Most preferably, the difference between the first order differential values of first velocity command value 42 and second velocity command value 50 is equal to zero (i.e., the first order differential values of the first and second velocity command values are equal to each other). In the example of FIG. 2, first velocity command value 42 is equal to second velocity command value, and the first order differential values of the first and second velocity command values are equal to each other (i.e., first velocity command value 42 is tangent to second velocity command value 50 at time point x).

Next, a procedure for determining deceleration start distance Ld will be explained with reference to FIG. 2 and a flowchart of FIG. 3.

First, after the approach motion is started, from the state in which the velocity of processing nozzle 12 relative to workpiece W is equal to maximum approach velocity Fa (at time point Td in FIG. 2), first velocity command value 42, in which the processing nozzle is decelerated at a predetermined deceleration rate (or a minus acceleration rate) (in region 48), and second velocity command value 50 generated based on the output by gap sensor, are respectively calculated (step S1). In this regard, since the output by gap sensor corresponds to deceleration start distance Ld at time point Td, time point Td can be determined by calculating deceleration start distance Ld.

In the next step S2, first time point x is calculated at which the absolute value of the difference between the first order differential value of first velocity command value 42 and second velocity command value is equal to or smaller than 10% of the absolute value of the first order differential value of first (or second) velocity command value 42 (or 50) (i.e., inclinations of two graphs of the first and second velocity command values are generally equal to each other).

In the next step S3, deceleration start distance Ld is calculated so that the absolute value of the difference between first velocity command value 42 and second velocity command value 50 at time point x (calculated in step S2) is equal to or smaller than 10% of the absolute value of first (or second) velocity command value 42 (or 50) at time point x (i.e., the first and second velocity command values are generally equal to each other). By using deceleration start distance Ld obtained as such, first velocity command value 42 from regions 44 to 48 is generated.

Figure 2:
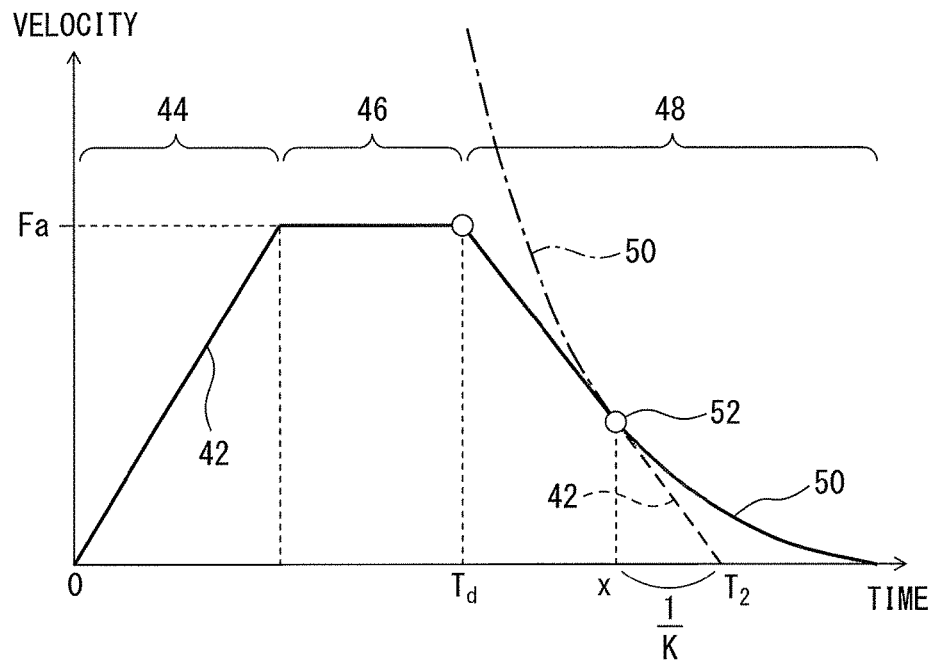
FIG. 2 is a graph showing an example of a change in velocity during approach motion of a processing nozzle of the laser processing device of FIG. 1.
Figure 3:
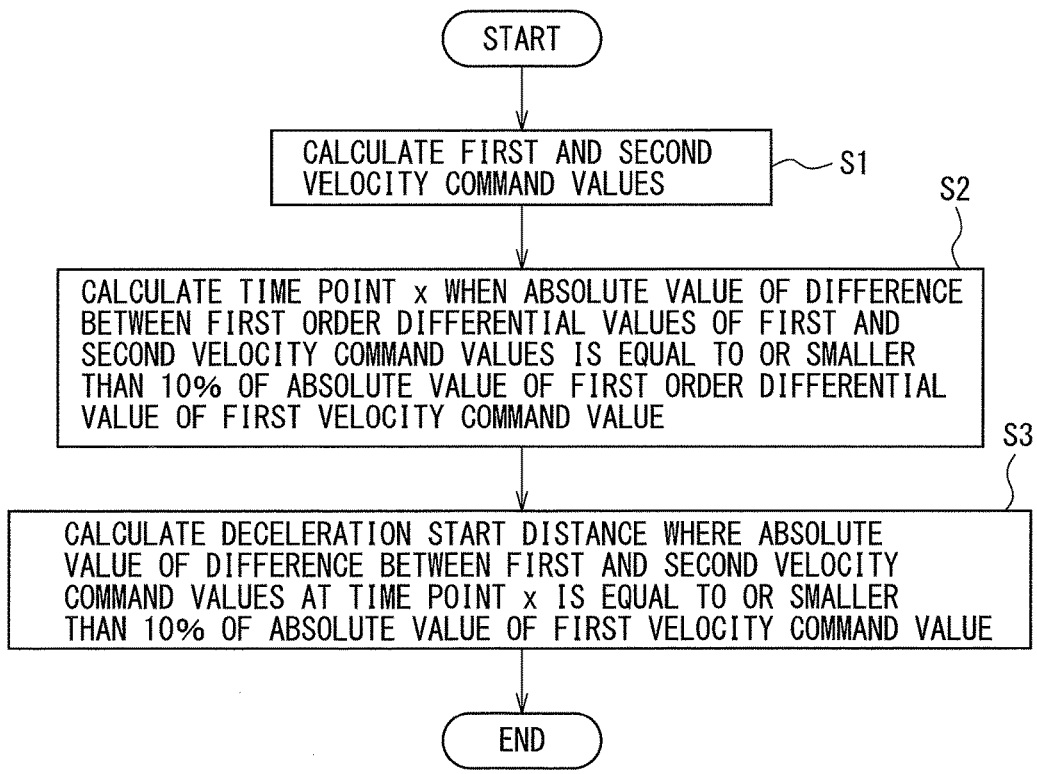
FIG. 3 shows a flowchart of an example of a procedure for calculating a deceleration start distance of the processing nozzle.

Next, a concrete method (or formula) for calculating deceleration start distance Ld is explained, when first velocity command value 42 is tangent to second velocity command value 50 at time point x, as shown in FIG. 2. In this regard, a control law of the gap control is a proportional control using a gap control gain K, and first velocity command value 42 is tangent to second velocity command value 50 at time point x, as shown in FIG. 2. Further, the deceleration rate of first velocity command value 42, after the deceleration is started (region 48), is a constant value "A" (i.e., $A=Fa/(T_2-Td)$).

As shown in FIG. 2, since first velocity command value 42 is tangent to second velocity command value 50 at time point x ($=T_2-1/K$), following equation (1) can be obtained, and equation (2) for calculating deceleration start distance Ld can be obtained by deforming equation (1).

$$F_a \frac{1}{KT_2} = K\left(L_d - \frac{1}{2}F_a T_2 \frac{K^2 T_2^2 - 1}{K^2 T_2^2}\right) \quad (1)$$

$$L_d = \frac{1}{2}F_a T_2 + \frac{1}{2}\frac{F_a}{K^2 T_2} = \frac{F_a^2}{2A} + \frac{A}{2K^2} \quad (2)$$

Assuming that a settling time of exponential-type acceleration/deceleration in the gap control corresponds to a quintuple (five times) of a time constant, a period of time Tf required for the approach motion of the processing nozzle can be calculated by following equation (3).

$$Tf = T_2 + \frac{4}{K} \quad (3)$$

Figure 4:
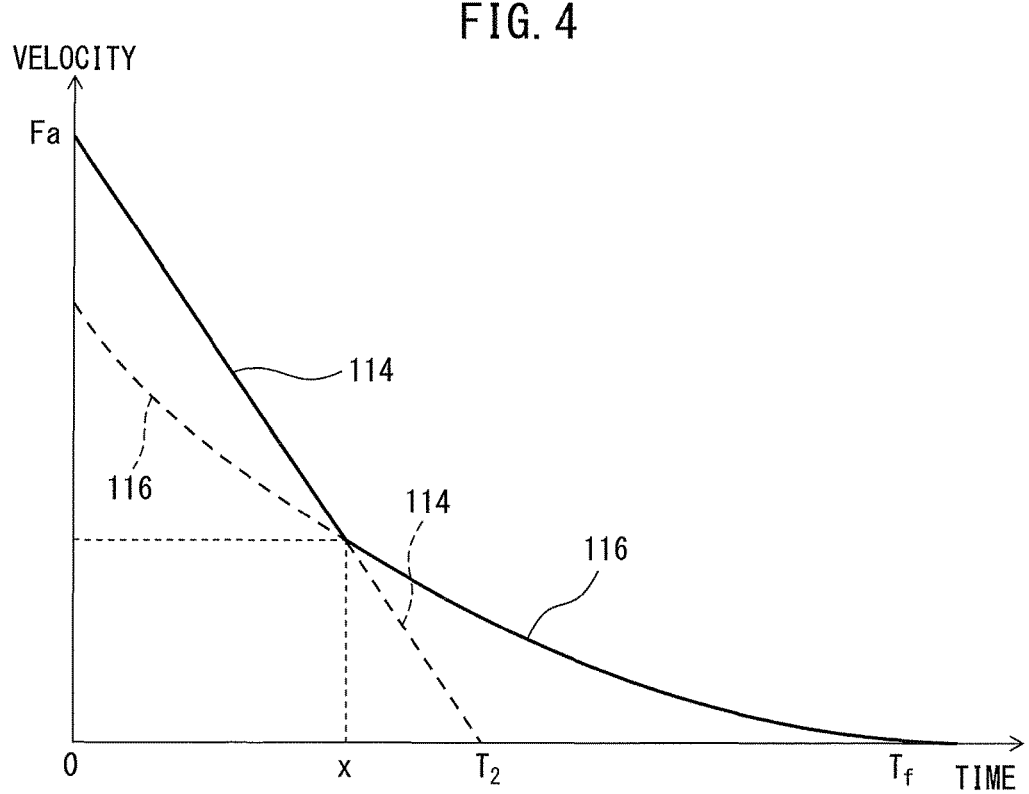
FIG. 4 is a graph showing a change in velocity during approach motion of a processing nozzle in the prior art, after deceleration motion of the processing nozzle is started.

FIG. 4 explains a comparative example of the invention, in which the approach motion is carried out by a conventional method. In this regard, FIG. 4 shows only a region corresponding to region 48 of FIG. 2 (after the deceleration motion is started), and the other regions are omitted. Each parameter such as the control gain, etc., is the same as the above parameter.

In the comparative example of FIG. 4, first velocity command value 114 merely intersects with (is not tangent to) second velocity command value 116 at time point x. in this case, following equation (4) is obtained, and equation (5) for calculating time point x can be obtained by deforming equation (4).

$$F_a\left(1 - \frac{x}{T_2}\right) = K\left\{L_d - F_a\left(x - \frac{1}{2}\frac{x^2}{T_2}\right)\right\} \quad (4)$$

$$x = T_2 - \frac{1}{K} + \frac{\sqrt{(1 + K^2 T_2^2)F_a^2 - 2L_d K^2 T_2 F_a}}{KF_a} \quad (5)$$

Similarly to the case of FIG. 2, assuming that a settling time of exponential-type acceleration/deceleration in the gap control corresponds to a quintuple (five times) of a time constant, a period of time Tf required for the approach motion of the processing nozzle in the prior art can be calculated by following equation (6). Accordingly, under the same condition, the approach motion can be minimized by switching the velocity command so that the first velocity command value is tangent to the second velocity command value.

$$Tf = T_2 + \frac{4}{K} + \frac{\sqrt{(1 + K^2 T_2^2)F_a^2 - 2L_d K^2 T_2 F_a}}{KF_a} \quad (6)$$

Next, calculation or determination of time point x and deceleration start distance Ld is explained, when the absolute value of the difference between the first and second velocity command values at time point x is equal to or smaller than α% of the absolute value of the first velocity command value at time point x, and the absolute value of the difference between the first order differential values of the first and second velocity command values at time point x is equal to or smaller than β% of the absolute value of the first order differential value of the first velocity command value at time point x.

In order that the absolute value of the difference between the first and second velocity command values at time point x is equal to or smaller than α% of the absolute value of the first velocity command value at time point x, following equation (7) must be true. Further, in order that the absolute value of the difference between the first order differential values of the first and second velocity command values at time point x is equal to or smaller than β% of the absolute value of the first order differential value of the first velocity command value at time point x, following equation (8) must be true.

$$-F_a \frac{x}{T_2} - \left(-KF_a\left(1 - \frac{x}{T_2}\right)\right) = \alpha F_a \frac{x}{T_2} \quad (7)$$

$$F_a\left(1 - \frac{x}{T_2}\right) - K\left\{L_d - F_a\left(x - \frac{1}{2}\frac{x^2}{T_2}\right)\right\} = -\beta F_a\left(1 - \frac{x}{T_2}\right) \quad (8)$$

By equations (7) and (8), time point x and deceleration start distance Ld can be calculated by following equations (9) and (10), respectively.

$$x = T_2 - \frac{1 + \alpha}{K} \quad (9)$$

$$L_d = \frac{1}{2}F_a T_2 + \frac{1}{2}\frac{F_a(1 + \alpha)(1 - \alpha + 2\beta)}{K^2 T_2} \quad (10)$$

Figure 5:
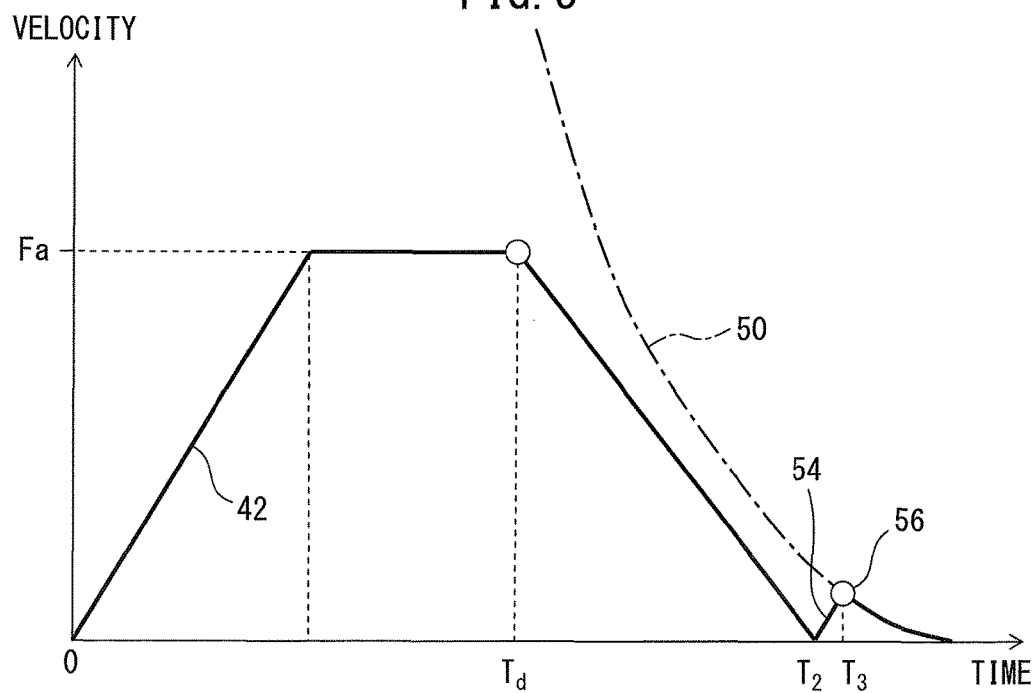
FIG. 5 is a graph showing another example of a change in velocity during approach motion of the processing nozzle of the laser processing device of FIG. 1.
Figure 6:
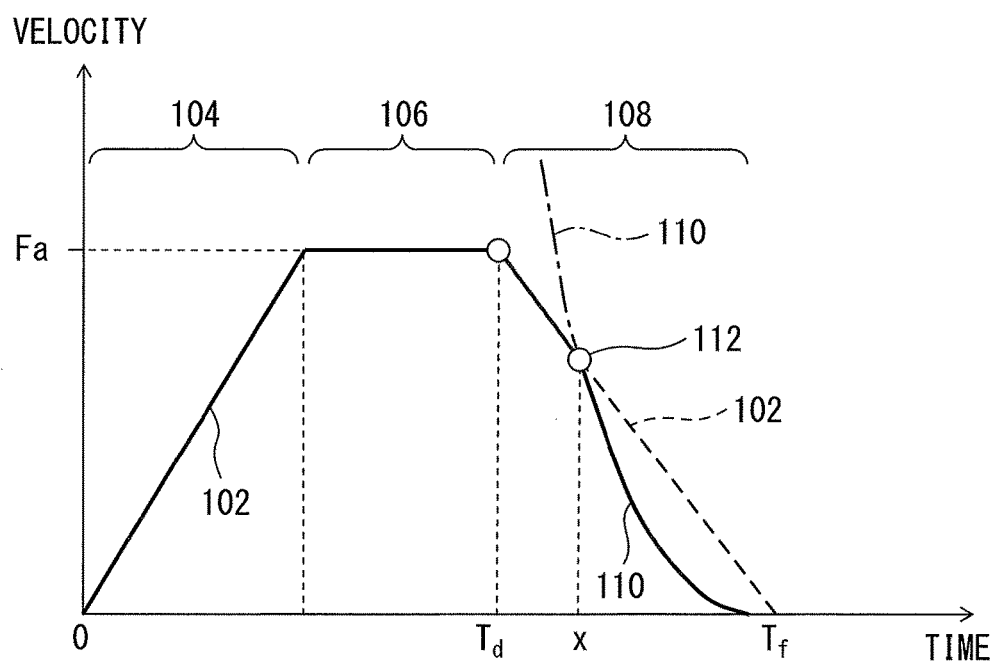
FIG. 6 is a graph showing a change in velocity during approach motion of a processing nozzle in the prior art.

FIG. 5 is a graph explaining a procedure for automatically starting the gap control, when the switching from the first velocity command value to the second velocity command value is failed. As shown in FIG. 5, when first velocity command value 42 becomes zero (at time point $T_2$) and second velocity command value 50 is not equal to zero at time point $T_2$, without switching from first velocity command value 42 to second velocity command value 50 by velocity command switching part 36, controller 26 moves processing nozzle 12 based on a third velocity command value 54 for accelerating processing nozzle 12 at an acceleration rate, an absolute value of the acceleration rate of third velocity command value 54 being equal to an absolute value of the deceleration rate from time point Td to time point $T_2$. Further, velocity command switching part 36 switches the velocity (motion) command for processing nozzle 12 from third velocity command value 54 to second velocity command value 50, after third velocity command value 54 intersects with second velocity command value 50 at an intersection point 56 (or at time point $T_3$). By virtue of such procedure, even when the switching of the velocity command value for the relative movement cannot be smoothly carried out due to the failure of position detector 18 or gap sensor 22, etc., the shock applied to processing nozzle 12 can be minimized and the approach motion time can also be minimized.

In the above embodiment, laser processing device has three drive axes (the X-, Y- and Z-axes), workpiece W (or movable table 20 on which workpiece W is mounted) can be moved in the X-Y plane, and processing nozzle 12 can be moved in the Z-direction. However, the present invention is not limited as such, and the present invention can be applied to a laser processing device having at least one axis by which a processing nozzle can be moved relative to a workpiece to be processed.

According to the present invention, the deceleration start distance for smoothly switching the velocity command can be automatically calculated, whereby the optimum approach motion of the processing nozzle can be easily realized.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A controller for a laser processing device for processing an object to be processed by condensing light from a processing nozzle, irradiating the light to the object, and moving the processing nozzle and/or the object relative to each other based on a processing program, the controller comprising:
   a deceleration start distance calculating part which calculates a deceleration start distance corresponding to a distance between the processing nozzle and the object when deceleration of relative movement between the processing nozzle and the object is started;
   a first velocity command generating part which generates a first velocity command value based on the deceleration start distance, a predetermined maximum approach velocity and a predetermined deceleration rate;
   a second velocity command generating part which generates a second velocity command value based on a target value of a gap between the processing nozzle and the object and a feedback value from a gap sensor for detecting the gap; and a velocity command switching part which switches a velocity command for the relative movement between the first and second velocity command values, wherein the deceleration start distance calculating part obtains the first velocity command value after the distance between the processing nozzle and the object is equal to the deceleration start distance and the second velocity command value, and calculates the deceleration start distance so that an absolute value of a difference between the first and second velocity command values at a first time point is equal to or smaller than 10% of an absolute value of the first velocity command value at the first time point, and so that an absolute value of a difference between first order differential values of the first and second velocity command values at the first time point is equal to or smaller than 10% of an absolute value of the first order differential value of the first velocity command value at the first time point.

2. The controller as set forth in claim 1, wherein the first velocity command generating part calculates the first velocity command value by multiplying a difference between the target value and the feedback value from the gap sensor by a gap control gain K, and the deceleration start distance calculating part calculates the deceleration start distance Ld by using a following equation, wherein characters K, Fa and A represents the gap control gain, the maximum approach velocity and the deceleration rate, respectively $$Ld=(Fa^2/2A)+(A/2K^2).$$

3. The controller as set forth in claim 1, wherein the absolute value of the difference between the first and second velocity command values at the first time point is equal to zero.

4. The controller as set forth in claim 1, wherein the absolute value of the difference between the first order differential values of the first and second velocity command values at the first time point is equal to zero.

5. The controller as set forth in claim 1, wherein the velocity command switching part carries out the relative movement based on the first velocity command value after the deceleration of the relative movement is started, and carries out the relative movement based on the second velocity command value after the second velocity command value is equal to or smaller than the first velocity command value.

6. The controller as set forth in claim 1, wherein, when the first velocity command value becomes zero and the second velocity command value is not equal to zero without switching from the first velocity command value to the second velocity command value by the velocity command switching part, the velocity command switching part carries out the relative movement based on a third velocity command value for accelerating the relative movement at an acceleration rate, an absolute value of the acceleration rate of the third velocity command value being equal to an absolute value of the deceleration rate, and the velocity command switching part carries out the relative movement based on the second velocity command value after the third velocity command value intersects with the second velocity command value.

7. A laser processing device comprising:
the controller as set forth in claim 1;
a processing nozzle;
a control axis which controls a distance between the processing nozzle and an object to be processed by a servomotor;
a position detecting part which detects a position of the control axis; and
a gap sensor which detects a gap between the processing nozzle and the object, the gap sensor being different from the position detecting part,
wherein the laser processing device processes the object by condensing light from the processing nozzle, irradiating the light to the object, and moving the processing nozzle and/or the object relative to each other based on a processing program.

* * * * *